(12) United States Patent
He et al.

(10) Patent No.: US 12,261,790 B2
(45) Date of Patent: Mar. 25, 2025

(54) INFORMATION DETERMINATION METHOD AND DEVICE, FIRST COMMUNICATION NODE AND STORAGE MEDIUM

(71) Applicant: ZTE Corporation, Shenzhen (CN)

(72) Inventors: Zhen He, Shenzhen (CN); Shujuan Zhang, Shenzhen (CN); Bo Gao, Shenzhen (CN); Ke Yao, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 331 days.

(21) Appl. No.: 17/708,373

(22) Filed: Mar. 30, 2022

(65) Prior Publication Data
US 2022/0224479 A1   Jul. 14, 2022

Related U.S. Application Data

(63) Continuation of application No. PCT/CN2020/109960, filed on Aug. 19, 2020.

(30) Foreign Application Priority Data

Sep. 30, 2019 (CN) .......................... 201910945697.2

(51) Int. Cl.
*H04L 5/00* (2006.01)

(52) U.S. Cl.
CPC .......... *H04L 5/0048* (2013.01); *H04L 5/0053* (2013.01)

(58) Field of Classification Search
CPC ... H04L 5/0048; H04L 5/0053; H04L 5/0023; H04L 5/0032; H04L 5/0044; H04L 5/0091; H04L 27/261; H04L 5/0057; H04L 5/0094; H04W 52/146; H04W 52/325; H04W 72/046; H04W 72/21; H04W 74/004; H04W 72/23; H04B 17/309
See application file for complete search history.

(56) References Cited

U.S. PATENT DOCUMENTS

| 2019/0190673 A1 | 6/2019 | Kwak et al. |
| 2019/0229792 A1 | 7/2019 | Pravin et al. |
| (Continued) | | |

FOREIGN PATENT DOCUMENTS

| CN | 108632971 A | 10/2018 |
| CN | 109890080 A | 6/2019 |
| (Continued) | | |

OTHER PUBLICATIONS

Qualcomm Incorporated, "Beam management for NR", 3GPP TSG-RAN WG1 Meeting #94bis R1-1811633 Chengdu, China, Oct. 8-12, 2018 (Year: 2018).*

(Continued)

*Primary Examiner* — Chi H Pham
*Assistant Examiner* — Samuel Dilan Rutnam
(74) *Attorney, Agent, or Firm* — Crowell & Moring LLP

(57) ABSTRACT

Disclosed is an information determination method and device, a first communication node, and a storage medium. The information determination method includes, in a case where a preset condition is satisfied, a reference signal is determined; and information of an uplink signal or information of an uplink channel is determined according to the reference signal.

14 Claims, 1 Drawing Sheet

(56) References Cited

U.S. PATENT DOCUMENTS

| | | | |
|---|---|---|---|
| 2019/0239212 A1 | 8/2019 | Wang et al. | |
| 2019/0273637 A1 | 9/2019 | Zhang et al. | |

FOREIGN PATENT DOCUMENTS

| | | | | |
|---|---|---|---|---|
| CN | 110535617 A | | 12/2019 | |
| JP | WO2021075521 A1 | * | 4/2021 | ............ H04W 76/20 |
| WO | WO 2014126319 | | 8/2014 | |
| WO | WO 2018/217063 A1 | | 11/2018 | |
| WO | WO 2019/128885 A1 | | 7/2019 | |
| WO | WO-2022212967 A1 | * | 10/2022 | ............ H04L 5/0051 |

OTHER PUBLICATIONS

Indian Office Action regarding 202217016648 dated Nov. 10, 2022, 5 pages.

International Search Report with English translation and Written Opinion regarding PCT/CN2020/109960 dated Nov. 20, 2020, 11 pages.

Ericsson, "Remaining details of beam management," 1-27 *3GPP TSG RAN WGJ* Meeting #92bis RI-1804974, Apr. 20, 2018, sections 2-3, 13 pages.

Ericsson, "Maintenance for beam management," 1-27 *3GPP TSG-RAN WGJ* Meeting #94 Tdoc RI-1809197, 24 Aug. 24, 2018, sections 2-3, 6 pages.

Intellectual Property Office of Singapore Search Report and Written Opinion regarding Appl. No. 11202203245W dated May 15, 2024, 10 pages.

Chinese Office Action with translation regarding 202210563261.9 dated Dec. 2, 2022, 10 pages.

NTT Docomo, Inc., "Discussion on multibeam enhancement," 3GPP TSG RAN WG1 #97, R1-1906225, dated May 3, 2019.

Second Chinese Office Action with English translation regarding 202210563261.9 dated Mar. 3, 2023.

Extended European Search Report regarding EP 20 87 1749 dated Dec. 21, 2022, 12 pages.

Qualcomm Incorporated, "Beam management for NR," 3GPP DRAFT; RI- 1811633 Beam Management for NR, 3rd Generation Partnership Project (3GPP), Mobile Competence Centre, 650, Route Des Lucioles, F-06921 Sophia-Antipolis Cedex, France, vol. RAN WGI, No. 20181008 Chengdu, China, Sep. 30, 2018, Retrieved from the Internet: URL:http://www.3gpp.org/ftp/tsg%5Fran/WG1%5FRL1/TSGR1%5F94b/Docs/RI%2DI811633%2Ezip.

Nokia et al, "Remaining issues on beam management,"3GPP Draft; RI-1809237, 3rd Generation Partnership Project (3GPP), Mobile Competence Centre, 650, Route Des Lucioles; F-06921 Sophia-Antipolis Cedex France, vol. RAN WGI, No. Gothenburg, Sweden, Aug. 10, 2018, XP051516604, Retrieved from the Internet: URL:http://www.3gpp.org/ftp/tsg%5Fran/WG1%5FRL1/TSGR1%5F94/Docs/RI%2DI809237%2Ezip.

Qualcomm Incorporated, "Remaining Details 1-15 on QCL," 3GPP Draft; RI-1802832, 3rd Generation Partnership Project (3GPP), Mobile Competence Centre; 650, Route Des Lucioles, F-06921 Sophia-Antipolis Cedex France, Feb. 17, 2018, pp. 1-12, XP051398245, Retrieved from the Internet: URL:http://www.3gpp.org/ftp/tsg%5Fran/WG1%5FRL1/TSGR1%5F92/Docs/.

Vivo, "Discussion on Enhancements on Multi-Beam Operation," 3GPP Draft; RI-1812324_Discussion on Enhancements on Multi-Beam Operation, 3rd Generation Partnership Project (3GPP), Mobile Competence Centre, 650, Route Des Lucioles, F-06921 Sophia-Antipolis Cedex vol. RAN WGI, No. Spokane, USA;, Nov. 11, 2018, XP051554229, Retrieved from the Internet: URL:http://www.3gpp.org/ftp/Meetings%5F3GPP%5FSYNC/RAN1/Docs/RI%2DI812324%2Ezip.

European Patent Office Action regarding Appl. No. 20 871 749.6 dated Oct. 9, 2024, 6 pages.

Korean Office Action with translation summary regarding Appl. No. 10-2022-7010524 dated Sep. 24, 2024, 7 pages.

Vivo, "Discussion on Enhancements on Multi-Beam Operation," 3GPP TSG RAN WG1 Meeting #95, R1-1812324, Spokane, USA, Nov. 3, 2018, 10 pages.

Qualcomm Incorporated, "Remaining Details on QCL," 3GPP TSG RAN WG1 Meeting #92, R1-1802832, Athens, Greece, Feb. 17, 2018, 12 pages.

* cited by examiner

INFORMATION DETERMINATION METHOD AND DEVICE, FIRST COMMUNICATION NODE AND STORAGE MEDIUM

RELATED APPLICATIONS

The present application is a continuation application of PCT International Patent Application No. PCT/CN2020/109960, filed on Aug. 19, 2020, which claims priority to Chinese Patent Application No. 201910945697.2, filed on Sep. 30, 2019, both of which are incorporated herein by reference in their entireties.

TECHNICAL FIELD

The present application relates to the field of communications, and for example to an information determination method and device, a first communication node, and a storage medium.

BACKGROUND

In the beam management, for determination of information of an uplink signal or an uplink channel, such as a beam indication, in general, a second communication node, such as a base station, configures or indicates an explicit reference signal for the uplink signal or the uplink channel in a preset manner (such as, radio resource control (RRC) signaling, MAC-CE signaling, and downlink control information (DCI)), where the reference signal may be a downlink signal, such as a synchronization signal block (SSB), a channel state information reference signal (CSI-RS), and may also be the uplink signal (such as SRS). If the reference signal is the downlink signal, then a first communication node, such as a user equipment (UE), may determine a transmission beam of the uplink signal or a transmission beam of the uplink channel according to a receiving beam of the downlink signal; and if the reference signal is the uplink signal, then the UE may determine a transmission beam of the uplink signal or a transmission beam of the uplink channel according to a transmission beam of the uplink signal.

However, in some cases, the base station cannot perform an effective beam indication of the uplink signal or an effective beam indication of the uplink channel through the above manners.

SUMMARY

The present application provides an information determination method and device, a first communication node, and a storage medium.

An embodiment of the present application provides an information determination method. The information determination method is applied to a first communication node, and the information determination method includes, in a case where a preset condition is satisfied, a reference signal is determined; and information of an uplink signal or an uplink channel is determined according to the reference signal.

An embodiment of the present application further provides an information determination device. The information determination device is configured at a first communication node, and the information determination device includes a reference signal determination module and an information determination module. The reference signal determination module is configured to determine a reference signal in a case where a preset condition is satisfied. The information determination module is configured to determine information of an uplink signal or information of an uplink channel according to the reference signal.

An embodiment of the present application further provides a first communications node. The first communications node includes one or more processors and a storage device configured to store one or more programs. The one or more programs, when executed by the one or more processors, cause the one or more processors to implement any of the information determination methods in the embodiments of the present application.

An embodiment of the present application further provides a storage medium. The storage medium stores a computer program. The computer program, when executed by a processor, implements any of the information determination methods in the embodiments of the present application.

DETAILED DESCRIPTION

Embodiments of the present application will be described below with reference to the accompanying drawings.

The steps illustrated in the flowchart of the drawings may be performed in a computer system such as a set of computer-executable instructions. Moreover, while a logical order is shown in the flowchart, however, in some cases, the steps shown or described may be performed in an order different than here.

Figure 1:
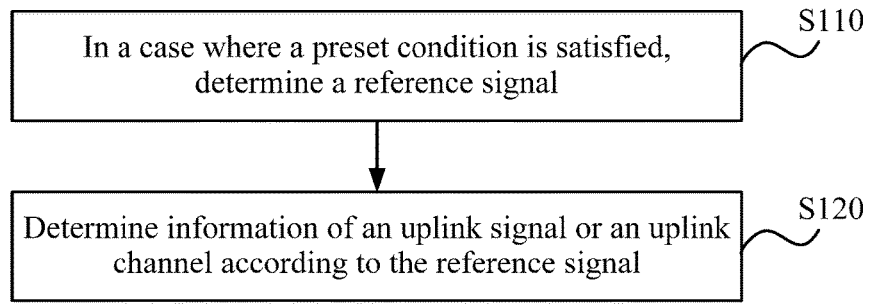
FIG. 1 is a schematic flowchart of an information determination method provided in an embodiment of the present application.

In an exemplary embodiment, FIG. 1 is a schematic flowchart of an information determination method provided in an embodiment of the present application, where the method may be applied to a case of determining information of an uplink signal or an uplink channel. The method may be performed by an information determination device provided in the present application, and the information determination device may be implemented by software and/or hardware, and integrated on a first communication node. The first communication node includes any suitable type of user equipment.

In the beam management, there is great flexibility in beam selection of downlink or uplink channels or signals, and beam indications of each physical channel or signal, such as a physical downlink control channel (PDCCH), a physical downlink shared channel (PDSCH), a channel sounding reference signal (SRS), and a physical uplink control channel (PUCCH), are configured independently. For example, for a beam indication of the PDCCH, a base station indicates (activates) a transmission configuration indicator (TCI) state for it through an activation command, such as media access control-control element (MAC-CE) signaling, the TCI state includes a quasi co-location (QCL) type D, i.e., a QCL-Type D downlink reference signal; for the PUCCH, the base station indicates spatial relationship information including an uplink or downlink reference signal for the PUCCH through the MAC-CE signaling. However, this beam indication method may cause excessive signaling (such as the MAC-CE signaling) overhead.

In a case of mutual benefit between uplink and downlink channels, the base station may configure a same downlink reference signal for the TCI state (QCL-Type D) and the spatial relationship information, for example, the base station activates the TCI state for the PDCCH through the MAC-CE signaling, the TCI state includes a QCL-Type D downlink reference signal, and the base station indicates spatial relationship information with a same downlink reference signal for the PUCCH through MAC-CE signaling, which is redundant.

In addition, when a physical uplink shared channel (PUSCH) is scheduled by a downlink control information (DCI) format 0_0, i.e., format 0_0, the UE may determine a spatial relationship of the PUSCH according to a spatial relationship corresponding to the PUCCH, however, when a serving cell does not include a PUCCH resource, the UE cannot determine the spatial relationship of the PUSCH. There is no effective solution to the above problems.

For example, when the PUSCH is scheduled by the downlink control information (DCI) format 0_0, according to a beam indication mechanism, the UE may determine a transmission beam of the PUSCH according to a transmission beam of the PUCCH in a serving cell where the PUSCH is located, but when the above serving cell does not include the PUCCH resource, the UE may not determine the transmission beam of the PUSCH. Secondly, when the PUCCH or SRS is not configured with the spatial relationship information, the UE may determine a transmission beam of the PUCCH or SRS according to a quasi co-location (QCL) reference signal of a quasi co-location type (QCL-Type) D associated with CORESET having a minimum control resource set identifier (CORESETID) in a nearest slot in the serving cell, but when the CORESET is not include in the above serving cell, the UE may not determine the transmission beam of the PUCCH or SRS. Finally, for an aperiodic PUCCH or SRS, the UE may determine the transmission beam of the PUCCH or SRS according to the QCL reference signal of the QCL-Type D associated with the PDCCH scheduling the PUCCH or SRS, but when the above PDCCH is located in a frequency range 1 (FR1) (low frequency) and the PUCCH or SRS is located in FR2 (high frequency), the UE cannot determine the transmission beam of the PUCCH or SRS in the above manner. In addition, for the above scenario, besides a transmission beam (or a transmission spatial filter) of the uplink signal or a transmission beam (or a transmission spatial filter) of the uplink channel cannot be determined, the UE may also not be able to effectively determine information such as a path loss reference signal and target power of the PUSCH, PUCCH, and SRS. There is no effective solution to the above problems.

The information determination method provided in the present application may reduce the signaling overhead while determining information of an uplink signal or an uplink channel. As shown in FIG. 1, the information determination method provided in the present application includes S110 and S120.

In S110, in a case where a preset condition is satisfied, a reference signal is determined.

In a case that information of an uplink signal or an uplink channel of a first communication node is determined, a corresponding reference signal may be determined based on the first communication node under different preset conditions for determining the information of the uplink signal or the information of the uplink channel.

Exemplarily, the preset condition may include a first preset condition, a second preset condition, a third preset condition, a fourth preset condition, and a fifth preset condition. The reference signal is determined by different means under different preset conditions, which is not limited herein.

In one embodiment, the first preset condition includes at least one of: the uplink signal is scheduled by a downlink control information (DCI) format 0_0 of a serving cell; the uplink channel is scheduled by a DCI format 0_0 of a serving cell; a serving cell where the uplink signal is located is not configured with a physical uplink control channel (PUCCH) resource; a serving cell where the uplink channel is located is not configured with a physical uplink control channel (PUCCH) resource; or the first communication node is not configured with a spatial setting for a PUCCH transmission.

For example, the first preset condition includes at least one of: the PUSCH is scheduled by a DCI format 0_0 of a serving cell; a serving cell where the PUSCH is located is not configured with a PUCCH resource; or the UE is not provided with a spatial setting for a PUCCH transmission.

In one embodiment, the second preset condition includes at least one of: the first communication node is not provided with spatial relationship information of the uplink signal or spatial relationship information of the uplink channel; a serving cell where the uplink signal is located does not include a CORESET; or a serving cell where the uplink channel is located does not include a CORESET.

For example, the second preset condition includes at least one of: the UE is not provided with spatial relation information of the PUCCH; the UE is not provided with spatial relationship information of the SRS; a service cell configured with the PUCCH does not include a CORESET; or a serving cell configured with the SRS does not include a CORESET.

In one embodiment, the third preset condition includes at least one of: the first communication node is not provided with spatial relationship information of the uplink channel; the first communication node is not provided with spatial relationship information of the uplink signal; a PDCCH scheduling the uplink signal is located in a first frequency band; a serving cell where the uplink signal is located is located in a second frequency band, where a frequency of the second frequency band is higher than a frequency of the first frequency band; a PDCCH scheduling the uplink channel is located in a first frequency band; a serving cell where the uplink channel is located is located in a second frequency band; the PDCCH scheduling the uplink signal does not associate with the quasi co-location reference signal of the first quasi co-location type; the PDCCH scheduling the uplink channel does not associate with the quasi co-location reference signal of the first quasi co-location type; a number of uplink signal resources included in an uplink signal resource set is greater than 1; a number of uplink signal resource sets is greater than 1; or a value of a first high-level parameter is greater than 1.

For example, the third preset condition includes at least one of: the UE is not provided with spatial relation information of the PUCCH; the UE is not provided with spatial relationship information of the SRS; a serving cell where the PUCCH is located is located in FR2, where the FR2 refers to a high frequency; a serving cell where the SRS is located is located in FR2; a scheduled PDCCH is located in FR1, where the FR1 refers to a low frequency; a scheduled PDCCH does not associate with a quasi co-location reference signal of a first quasi co-location type; a number of SRS resources included in an SRS resource set is greater than 1; a number of SRS resource sets is greater than 1; or a value of a high-level parameter is greater than 1.

In one embodiment, the fourth preset condition includes at least one of: the first communication node is not provided with spatial relationship information of the uplink channel.

In one embodiment, the fifth preset condition includes at least one of: the first communication node is not provided with spatial relationship information of the uplink signal.

For example, the fourth preset condition and the fifth preset condition include at least one of: the UE is not provided with spatial relation information of the PUCCH; the UE is not provided with spatial relationship information of the SRS.

Means for determining the reference signal under different preset conditions may include at least one of: determining from a quasi co-location reference signal of a first quasi co-location type associated with a scheduled PDCCH; determining from a quasi co-location reference signal of a first quasi co-location type associated with an activated TCI state applied to a PDSCH and having a minimum TCI state identifier; determining from a SSB associated with a closest PRACH; determining from a quasi co-location reference signal of a first quasi co-location type associated with a CORESET having a minimum control resource set identifier (CORESET ID) in a nearest slot, i.e., slot; determining from a first signaling configured by a base station; or determining from a first PUCCH path loss reference signal in a PUCCH path loss reference signal set corresponding to the PUCCH.

In S120, information of an uplink signal or an uplink channel is determined according to the reference signal.

After the reference signal is determined, there may be different determination manners based on different information to be determined, which is not limited herein. The information includes, but is not limited to, a spatial relationship, a path loss reference signal. Exemplarily, in a case where the information is a spatial filter, a spatial filter of the uplink signal and/or the uplink channel may be determined according to a spatial filter of the reference signal. In a case where the information is the path loss reference signal, the reference signal may be directly used as the path loss reference signal.

A second communication node may know in advance a manner in which the first communication node determines the information of the uplink signal or the information of the uplink channel. Therefore, the second communication node may determine information of the first communication node or uplink information directly according to a manner in which the first communication node determines the reference signal, and then the second communication node communicates with the first communication node based on the determined information. For example, in a case where the second communication node determines that the first communication node satisfies the preset condition, a corresponding reference signal is determined, and then the information of the uplink signal or the information of the uplink channel of the first communication node is determined.

According to the information determination method provided in the present application, in a case where the preset condition is satisfied, the reference signal is determined; and the information of the uplink signal or the information of the uplink channel is determined according to the reference signal. By using the method, the signaling overhead is greatly reduced in a case of mutual benefit between uplink and downlink channels.

On the basis of the above-described embodiments, a modified embodiment of the above-described embodiments is proposed, and in order to make the description brief, only the differences from the above-described embodiments are described in the modified embodiment.

In one embodiment, the step in which the information of the uplink signal or the information of the uplink channel is determined according to the reference signal includes at least one of: a transmission spatial filter of the uplink signal or a transmission spatial filter of the uplink channel is determined according to a transmission spatial filter of the reference signal; the transmission spatial filter of the uplink signal or the transmission spatial filter of the uplink channel is determined according to a receiving spatial filter of the reference signal; or a path loss reference signal of the uplink signal or a path loss reference signal of the uplink channel is determined according to the reference signal.

In this application, the transmission spatial filter of the reference signal may be used as the transmission spatial filter of the uplink signal or the transmission spatial filter of the uplink channel, the receiving spatial filter of the reference signal is used as the transmission spatial filter of the uplink signal or the transmission spatial filter of the uplink channel, and the reference signal is used as the path loss reference signal of the uplink signal or the path loss reference signal of the uplink channel.

In one embodiment, the uplink signal includes an SRS, and the uplink channel includes at least one of a PUCCH or a physical uplink shared channel.

In one embodiment, the preset condition includes a first preset condition, and the reference signal includes a quasi co-location reference signal of a first quasi co-location type associated with a physical downlink control channel (PDCCH), where the PDCCH schedules the uplink signal or the uplink channel.

In one embodiment, the first preset condition includes at least one of: the uplink signal is scheduled by a downlink control information (DCI) format 0_0 of a serving cell; the uplink channel is scheduled by a downlink control information (DCI) format 0_0 of a serving cell; a serving cell where the uplink signal is located is not configured with a physical uplink control channel (PUCCH) resource; a serving cell where the uplink channel is located is not configured with a physical uplink control channel (PUCCH) resource; or the first communication node is not configured with a spatial setting for a PUCCH transmission.

In this example, the information determination method of the present application may be considered as a PUSCH transmission spatial filter determination method. This method includes, in a case where the preset condition is satisfied, the UE determines the reference signal; the UE determines a transmission spatial filter of the PUSCH according to the reference signal; and the UE determines a transmission spatial filter for transmitting the PUSCH according to a receiving spatial filter of the reference signal, in other words, the UE determines a transmission beam for transmitting the PUSCH according to a receiving beam of the reference signal.

The reference signal may be a quasi co-location reference signal of a first quasi co-location type associated with the PDCCH scheduling the PUSCH. The "first quasi co-location type" includes one of a QCL-Type D or a QCL-Type A, where the QCL-Type D means that a target channel or signal (such as PDCCH) and a source reference signal (or quasi co-location reference signal) have a same receiving spatial filter, in other words, the target channel or signal and the source reference signal have a same receiving beam; the QCL-Type A means that a target channel or signal (such as PDCCH) and a source reference signal (or quasi co-location reference signal) having a same parameter for demodulation (such as doppler shift, doppler spread, average delay, delay spread).

Namely, in a case where the first preset condition is satisfied, the UE determines the reference signal according to the quasi co-location reference signal of the first quasi co-location type associated with a scheduled PDCCH; where the reference signal and the PUSCH have a same spatial relationship; "scheduled PDCCH" means that downlink control information (DCI) located on the PDCCH is used for scheduling the PUSCH. "spatial relationship" refers to a spatial filter; the "reference signal has a same spatial relationship with the PUSCH" means that the UE transmits the PUSCH according to a spatial relationship (or spatial filter) to which the reference signal corresponds, in other words, the PUSCH has a same transmission beam as the reference signal.

In this example, the preset condition includes at least one of: the PUSCH is scheduled by a DCI format 0_0 of a serving cell; a serving cell where the PUSCH is located is not configured with a PUCCH resource; or the UE is not provided with a spatial setting for a PUCCH transmission.

For example, a DCI on a PDCCH located in a serving cell schedules a PUSCH transmission, and the DCI format is DCI format 0_0. The base station activates a transmission configuration indication (TCI) state for receiving the PDCCH, and a QCL reference signal of a QCL-Type D in the TCI state is a CSI-RS. In addition, the serving cell where the PUSCH is located is not configured with the PUCCH resource. In the above case, the UE may determine a transmission spatial filter for transmitting the PUSCH according to a receiving spatial filter of the QCL reference signal (i.e., CSI-RS) of the QCL-Type D associated with the scheduled PDCCH, that is, the UE may determine the transmission beam of the PUSCH according to a receiving beam of the CSI-RS.

In this example, the method described in this application may be considered as a PUSCH path loss reference signal determination method. This method includes, in a case where the preset condition is satisfied, the UE determines the reference signal; the UE determines a path loss reference signal of the PUSCH according to the reference signal; and the "path loss reference signal of the PUSCH" means that the UE may calculate a path loss of the PUSCH according to the path loss reference signal of the PUSCH.

The reference signal may be a quasi co-location reference signal of a first quasi co-location type associated with the PDCCH scheduling the PUSCH.

Namely, in a case where the first preset condition is satisfied, the UE determines the reference signal according to the quasi co-location reference signal of the first quasi co-location type associated with a scheduled PDCCH; where the reference signal refers to a path loss reference signal of the PUSCH; the "path loss reference signal of the PUSCH" means that the UE may calculate a path loss of the PUSCH according to the path loss reference signal of the PUSCH.

The preset condition includes at least one of: the PUSCH is scheduled by a DCI format 0_0 of a serving cell; a serving cell where the PUSCH is located is not configured with a PUCCH resource; or the UE is not provided with a spatial setting for a PUCCH transmission.

For example, a DCI on a PDCCH located in a serving cell schedules a PUSCH transmission, and the DCI format is DCI format 0_0. The base station activates a transmission configuration indication (TCI) state for receiving the PDCCH, and a QCL reference signal of a QCL-Type D in the TCI state is a CSI-RS. In addition, the serving cell where the PUSCH is located is not configured with the PUCCH resource. In the above case, the UE may determine the path loss reference signal of the PUSCH according to the QCL reference signal (i.e., CSI-RS) of the QCL-Type D associated with the scheduled PDCCH, that is, the UE may calculate the path loss of the PUSCH according to the CSI-RS.

In one embodiment, the preset condition includes a first preset condition, and the reference signal includes a quasi co-location reference signal of a first quasi co-location type associated with an activated TCI state, where the activated TCI state is applied to a PDSCH and has a minimum TCI state identifier (i.e., ID), where the TCI state is used for indicating a quasi co-location assumption of the PDSCH; and the reference signal has the same spatial relationship as the PUSCH.

The method in this example may be considered as a PUSCH transmission spatial filter determination method. This method includes, in a case where the preset condition is satisfied, the UE determines the reference signal; and the UE determines a transmission spatial filter of the PUSCH according to the reference signal.

The reference signal may be a quasi co-location reference signal of a first quasi co-location type associated with an activated TCI state, where the activated TCI state is applied to a PDSCH and has a minimum TCI state identifier, i.e., ID; where the TCI state is used for indicating a quasi co-location assumption of the PDSCH, here, i.e., the receiving spatial filter of the PDSCH.

The preset condition includes at least one of: the PUSCH is scheduled by a DCI format 0_0 of a serving cell; a serving cell where the PUSCH is located is not configured with a PUCCH resource; or the UE is not provided with a spatial setting for a PUCCH transmission.

For example, a DCI on a PDCCH located in a serving cell schedules a PUSCH transmission, and the DCI format is DCI format 0_0. The base station activates a TCI state set for receiving the PDSCH in the serving cell through MAC-CE signaling, where the TCI state set includes a TCI state 1, a TCI state 2 and a TCI state 3, and QCL reference signals of a QCL-Type D in the 3 TCI states are a CSI-RS 1, a CSI-RS 2 and a CSI-RS 3 respectively. In addition, the serving cell where the PUSCH is located is not configured with the PUCCH resource. In the above case, the UE may determine a transmission spatial filter for transmitting the PUSCH according to a receiving spatial filter of the QCL reference signal (i.e., CSI-RS 1) of the QCL-Type D associated with the activated TCI state (i.e., TCI state 1), where the activated TCI state is applied to a PDSCH and has a minimum TCI state identifier, i.e., ID, that is, the UE may determine the transmission beam of the PUSCH according to a receiving beam of the CSI-RS 1.

In this example, the method provided in this application may be considered as a PUSCH path loss reference signal determination method. This method includes, in a case where the preset condition is satisfied, the UE determines the reference signal; and the UE determines a path loss reference signal of the PUSCH according to the reference signal.

The reference signal may be a quasi co-location reference signal of a first quasi co-location type associated with an activated TCI state, where the activated TCI state is applied to a PDSCH and has a minimum TCI state identifier, i.e., ID; where the TCI state is used for indicating a quasi co-location assumption of the PDSCH.

The quasi co-location reference signal includes a periodic downlink reference signal. That is, in the case where the path loss reference signal of the uplink signal or the path loss reference signal of the uplink channel is determined, the quasi co-location reference signal includes the periodic downlink reference signal.

The preset condition includes at least one of: the PUSCH is scheduled by a DCI format 0_0 of a serving cell; a serving cell where the PUSCH is located is not configured with a PUCCH resource; or the UE is not provided with a spatial setting for a PUCCH transmission.

For example, a DCI on a PDCCH located in a serving cell schedules a PUSCH transmission, and the DCI format is DCI format 0_0. The base station activates a TCI state set for receiving a PDSCH in the serving cell through MAC-CE signaling, where the TCI state set includes a TCI state 1, a TCI state 2 and a TCI state 3, and QCL reference signals of a QCL-Type D in the 3 TCI states are a CSI-RS 1, a CSI-RS 2 and a CSI-RS 3 respectively, and the CSI-RS 1, the CSI-RS 2 and the CSI-RS 3 are periodic CSI-RSs. In addition, the serving cell where the PUSCH is located is not configured with the PUCCH resource. In the above case, the UE may determine a path loss reference signal of the PUSCH according to the QCL reference signal (i.e., CSI-RS 1) of the QCL-Type D associated with the activated TCI state (i.e., TCI state 1), where the activated TCI state is applied to a PDSCH and has a minimum TCI state identifier, i.e., ID, that is, the UE may calculate a path loss of the PUSCH according to the CSI-RS 1.

In one embodiment, the preset condition includes a first preset condition, and the reference signal includes a downlink signal associated with a physical random access channel (PRACH), where the PRACH is a PRACH closest to the uplink signal or the uplink channel in a time domain.

In one embodiment, the downstream signal includes one of a synchronization signal block, or a channel state information reference signal.

In this example, the method described in this application may be considered as a PUSCH transmission spatial filter determination method. This method includes, in a case where the preset condition is satisfied, the UE determines the reference signal; and the UE determines a transmission spatial filter of the PUSCH according to the reference signal.

The reference signal may be a downlink signal associated with a closest PRACH; the "closest PRACH" refers to a PRACH closest to the PUSCH in a time domain. The downlink signal includes one of a SSB or a CSI-RS. The preset condition includes at least one of: the PUSCH is scheduled by a DCI format 0_0 of a serving cell; a serving cell where the PUSCH is located is not configured with a PUCCH resource; or the UE is not provided with a spatial setting for a PUCCH transmission.

For example, a DCI on a PDCCH located in a serving cell schedules a PUSCH transmission, and the DCI format is DCI format 0_0; and the PRACH closest to the PUSCH in the time domain is associated with an SSB, in other words, the UE transmits the PRACH by using the same spatial filter as a spatial filter used for receiving the SSB, in other words, the UE determines the transmission beam of the PRACH according to the receiving beam of the SSB. In addition, the serving cell where the PUSCH is located is not configured with the PUCCH resource. In the above case, the UE may determine a transmission spatial filter for transmitting the PUSCH according to the transmission spatial filter of the reference signal (i.e., SSB) associated with the closest PRACH, that is, the UE may determine a transmission beam for transmitting the PUSCH according to the receiving beam of the SSB.

In this example, the method described in this application may be considered as a PUSCH path loss reference signal determination method. This method includes, in a case where the preset condition is satisfied, the UE determines the reference signal; and the UE determines a path loss reference signal of the PUSCH according to the reference signal.

The reference signal may be a downlink signal associated with the closest PRACH to determine a third path loss reference signal; and the "closest PRACH" refers to a PRACH closest to the PUSCH in a time domain. The downlink signal includes one of a SSB or a CSI-RS.

The preset condition includes at least one of: the PUSCH is scheduled by a DCI format 0_0 of a serving cell; a serving cell where the PUSCH is located is not configured with a PUCCH resource; or the UE is not provided with a spatial setting for a PUCCH transmission.

For example, a DCI on a PDCCH located in a serving cell schedules a PUSCH transmission, and the DCI format is DCI format 0_0; and the PRACH closest to the PUSCH in the time domain is associated with an SSB, in other words, the UE transmits the PRACH by using the same spatial filter as a spatial filter used for receiving the SSB, in other words, the UE determines the transmission beam of the PRACH according to the receiving beam of the SSB. In addition, the serving cell where the PUSCH is located is not configured with the PUCCH resource. In the above case, the UE may determine a path loss reference signal of the PUSCH according to the reference signal (i.e., the SSB) associated with the closest PRACH, that is, the UE may calculate a path loss of the PUSCH according to the SSB.

In one embodiment, the preset condition includes a first preset condition, and the reference signal includes a quasi co-location reference signal of a first quasi co-location type associated with a control resource set (CORESET) in a nearest slot, where the CORESET has a minimum control resource set identifier. The nearest slot may be considered to be a slot closest to the uplink signal or the uplink channel.

In an example, the method described in this application may be considered as a PUSCH transmission spatial filter determination method. This method includes, in a case where the preset condition is satisfied, the UE determines the reference signal; and the UE determines a transmission spatial filter of the PUSCH according to the reference signal. The reference signal may be a quasi co-location reference signal of a first quasi co-location type associated with a CORESET in a nearest slot, where the CORESET has a minimum control resource set identifier (CORESET ID). The preset condition includes at least one of: the PUSCH is scheduled by a DCI format 0_0 of a serving cell; a serving cell where the PUSCH is located is not configured with a PUCCH resource; or the UE is not provided with a spatial setting for a PUCCH transmission.

For example, a DCI on a PDCCH located in a serving cell schedules a PUSCH transmission, and the PUSCH transmission is located on a slot n, and the DCI format is DCI format 0_0; on the slot n, the base station configures 2 CORESET for the UE, i.e., a CORESET 0, a CORESET 1; the base station receives source reference signals in the QCL-Type D in a TCI state where the CORESET 0 and the CORESET 1 are activated through MAC-CE signaling, where the source reference signals in the QCL-Type D are a CSI-RS 1 and a CSI-RS 2, respectively, namely the QCL reference signals of the QCL-Type D associated with the CORESET 0 and the CORESET 1 are the CSI-RS 1 and the CSI-RS 2, respectively. In addition, the serving cell where the PUSCH is located is not configured with the PUCCH resource. In the above case, the UE may determine the transmission spatial filter for transmitting the PUCCH according to a receiving spatial filter of the QCL reference signal (i.e., CSI-RS 1) of the QCL-Type D associated with the CORESET (i.e., CORESET 0) having the CORESET ID in a nearest slot (i.e., slot n), that is, the UE may determine a transmission beam for transmitting the PUSCH according to a receiving beam of the CSI-RS 1.

In this example, the method described in this application may be considered as a PUSCH path loss reference signal determination method. This method includes, in a case where the preset condition is satisfied, the UE determines the reference signal; and the UE determines a path loss reference signal of the PUSCH according to the reference signal.

The reference signal may be a quasi co-location reference signal of a first quasi co-location type associated with a CORESET in a nearest slot, where the CORESET has a minimum control resource set identifier (CORESET ID).

The preset condition includes at least one of: the PUSCH is scheduled by a DCI format 0_0 of a serving cell; a serving cell where the PUSCH is located is not configured with a PUCCH resource; or the UE is not provided with a spatial setting for a PUCCH transmission.

For example, a DCI on a PDCCH located in a serving cell schedules a PUSCH transmission, and the PUSCH transmission is located on a slot n, and the DCI format is DCI format 0_0; on the slot n, the base station configures 2 CORESET for the UE, i.e., a CORESET 0, a CORESET 1; the base station receives source reference signals in the QCL-Type D in a TCI state where the CORESET 0 and the CORESET 1 are activated through MAC-CE signaling, where the source reference signals in the QCL-Type D are a CSI-RS 1 and a CSI-RS 2, respectively, namely the QCL reference signals of the QCL-Type D associated with the CORESET 0 and the CORESET 1 are the CSI-RS 1 and the CSI-RS 2, respectively. In addition, the serving cell where the PUSCH is located is not configured with the PUCCH resource. In the above case, the UE may determine the path loss reference signal of the PUSCH according to the QCL reference signal (i.e., CSI-RS 1) of the QCL-Type D associated with the CORESET (i.e., CORESET 0) having the CORESET ID in a nearest slot (i.e., slot n), that is, the UE may calculate a path loss of the PUSCH according to the CSI-RS 1.

In one embodiment, the preset condition includes a second preset condition, and the reference signal includes a reference signal configured by a second communication node.

In one embodiment, the second preset condition includes at least one of: the first communication node is not provided with spatial relationship information of the uplink signal or spatial relationship information of the uplink channel; a serving cell where the uplink signal is located does not include a CORESET; or a serving cell where the uplink channel is located does not include a CORESET.

In this example, the method described in this application may be considered as a PUCCH or SRS transmission spatial filter determination method. This method includes, in a case where the preset condition is satisfied, the UE determines the reference signal; and the UE determines a transmission spatial filter of the PUCCH or SRS according to the reference signal.

The reference signal may be a reference signal configured by a base station. The base station may configure the reference signal through first signaling. The first signaling includes at least one of RRC signaling or MAC-CE signaling.

The preset condition includes at least one of: the UE is not provided with spatial relation information of the PUCCH; the UE is not provided with spatial relationship information of the SRS; a service cell configured with the PUCCH does not include a CORESET; or a serving cell configured with the SRS does not include a CORESET.

The PUCCH is used as an example, a PUCCH transmission spatial filter determination method is introduced, and this method is also applicable to a determination of the SRS transmission spatial filter.

For example, there is a PUCCH transmission in a serving cell, and this serving cell does not include the CORESET. In addition, the UE is not provided with spatial relationship information of the PUCCH, that is, the UE does not know a transmission spatial filter of the PUCCH, in other words, the UE does not determine a transmission beam of the PUCCH. In the above case, the base station configures the reference signal through the RRC signaling or the MAC-CE signaling, and it is assumed that the reference signal is the SRS, then the UE may determine a transmission spatial filter for transmitting the PUCCH according to a transmission spatial filter of the reference signal (i.e., SRS) configured by the base station, that is, the UE may determine a transmission beam of the PUCCH according to the transmission beam of SRS.

In one embodiment, the preset condition includes a second preset condition, and the reference signal includes a quasi co-location reference signal of a first quasi co-location type associated with a PDCCH, where the PDCCH schedules the uplink signal or the uplink channel.

In this example, the method described in this application may be considered as a PUCCH or SRS transmission spatial filter determination method. This method includes, in a case where the preset condition is satisfied, the UE determines the reference signal; and the UE determines a transmission spatial filter of the PUCCH or SRS according to the reference signal.

The reference signal may be a quasi co-location reference signal of a first quasi co-location type associated with a PDCCH scheduling a PUCCH or an SRS.

The preset condition includes at least one of: the UE is not provided with spatial relation information of the PUCCH; the UE is not provided with spatial relationship information of the SRS; a service cell configured with the PUCCH does not include a CORESET; or a serving cell configured with the SRS does not include a CORESET.

Next, the PUCCH is used as an example, a PUCCH transmission spatial filter determination method is introduced, and this method is also applicable to a determination of the SRS transmission spatial filter.

For example, a DCI on a PDCCH located in a serving cell schedules a PUCCH transmission; the base station activates a transmission configuration indication (TCI) state for receiving the PDCCH, where a QCL reference signal of a QCL-Type D in the TCI state is a CSI-RS. In addition, the UE is not provided with spatial relationship information of the PUCCH. In the above case, the UE may determine a transmission spatial filter for transmitting the PUCCH according to a receiving spatial filter of a QCL reference signal (i.e., CSI-RS) of a QCL-Type D associated with a scheduled PDCCH, that is, the UE may determine a transmission beam of the PUCCH according to a receiving beam of the CSI-RS.

In one embodiment, the preset condition includes a second preset condition, and the reference signal includes a quasi co-location reference signal of a first quasi co-location type associated with an activated TCI state, where the activated TCI state is applied to a PDSCH and has a minimum TCI state identifier.

In this example, the method described in this application may be considered as a PUCCH or SRS transmission spatial filter determination method. This method includes, in a case where the preset condition is satisfied, the UE determines the reference signal; and the UE determines a transmission spatial filter of the PUCCH or SRS according to the reference signal.

The reference signal may be a quasi co-location reference signal of a first quasi co-location type associated with an activated TCI state, where the activated TCI state is applied to a PDSCH and has a minimum TCI state identifier.

The preset condition includes at least one of: the UE is not provided with spatial relation information of the PUCCH; the UE is not provided with spatial relationship information of the SRS; a service cell configured with the PUCCH does not include a CORESET; or a serving cell configured with the SRS does not include a CORESET.

The PUCCH is used as an example, a PUCCH transmission spatial filter determination method is introduced, and this method is also applicable to a determination of the SRS transmission spatial filter.

For example, there is a PUCCH transmission in a serving cell; a base station activates a TCI state set for receiving a PDSCH in this serving cell through MAC-CE signaling, where the TCI state set includes a TCI state 1, a TCI state 2 and a TCI state 3, and QCL reference signals of the QCL-Type D in the 3 TCI states are CSI-RS 1, CSI-RS 2 and CSI-RS 3, respectively. In addition, the UE is not provided with spatial relationship information of the PUCCH. In the above case, the UE may determine a transmission spatial filter for transmitting the PUSCH according to a receiving spatial filter of the QCL reference signal (i.e., CSI-RS 1) of the QCL-Type D associated with an activated TCI state (i.e., TCI state 1), where the activated TCI state is applied to a PDSCH and has a minimum TCI state identifier, that is, the UE may determine the transmission beam of the PUSCH according to a receiving beam of the CSI-RS 1.

In one embodiment, the preset condition includes a third preset condition, and the reference signal includes a reference signal configured by a second communication node.

In one embodiment, the third preset condition includes at least one of: the first communication node is not provided with spatial relationship information of the uplink channel; the first communication node is not provided with spatial relationship information of the uplink signal; a PDCCH scheduling the uplink signal is located in a first frequency band, such as FR1; a serving cell where the uplink signal is located is located in a second frequency band, such as FR2, where a frequency of the second frequency band is higher than a frequency of the first frequency band; a PDCCH scheduling the uplink channel is located in a first frequency band; a serving cell where the uplink channel is located is located in a second frequency band; a PDCCH scheduling the uplink signal does not associate with the quasi co-location reference signal of the first quasi co-location type; a PDCCH scheduling the uplink channel does not associate with the quasi co-location reference signal of the first quasi co-location type; a number of uplink signal resources included in an uplink signal resource set is greater than 1; a number of uplink signal resource sets is greater than 1; or a value of a first high-level parameter is greater than 1.

In this example, the method described in this application may be considered as a PUCCH or SRS transmission spatial filter determination method. This method includes, in a case where the preset condition is satisfied, the UE determines the reference signal; and the UE determines a transmission spatial filter of the PUCCH or SRS according to the reference signal.

The reference signal may be a reference signal configured by a base station. The base station may configure the reference signal through first signaling. The first signaling includes at least one of RRC signaling or MAC-CE signaling.

The preset condition includes at least one of: the UE is not provided with spatial relation information of the PUCCH; the UE is not provided with spatial relationship information of the SRS; a serving cell where the PUCCH is located is located in FR2, where the FR2 refers to a high frequency; a serving cell where the SRS is located is located in FR2; a scheduled PDCCH is located in FR1, where the FR1 refers to a low frequency, and the FR2 is greater than the FR1; a scheduled PDCCH does not associate with a quasi co-location reference signal of a first quasi co-location type; a number of SRS resources included in an SRS resource set is greater than 1; a number of SRS resource sets is greater than 1; or a value of a first high-level parameter (such as maxNumberRxBeam) is greater than 1, where the maxNumberRxBeam refers to a maximum number of the UE for receiving beams, where a receiving beam herein refers to a set of CSI-RSs.

The PUCCH is used as an example, a PUCCH transmission spatial filter determination method is introduced, and this method is also applicable to a determination of the SRS transmission spatial filter.

For example, a serving cell 1 is located in the FR1, a serving cell 2 is located in the FR2, and a DCI on a PDCCH located in the serving cell 1 (it is assumed that the serving cell 1 is a primary cell (PCell)) schedules a PUCCH transmission located in the serving cell 2; however, the base station does not configure a QCL reference signal of a QCL-Type D for receiving the PDCCH, which may indicate that, in the FR1, the UE receives the PDCCH omnidirectionally, i.e., the UE does not use a specific receiving beam; in addition, the value of the high-level parameter maxNumberRxBeam provided by the UE is greater than 1, and the UE is not provided with spatial relationship information of the PUCCH. In the above case, the base station configures the reference signal through the RRC signaling or the MAC-CE signaling, and it is assumed that the reference signal is the SRS, then the UE may determine a transmission spatial filter for transmitting the PUCCH according to a transmission spatial filter of the reference signal (i.e., SRS) configured by the base station, that is, the UE may determine a transmission beam of the PUCCH according to the transmission beam of SRS.

In one embodiment, the preset condition includes a third preset condition, and the reference signal includes a quasi co-location reference signal of a first quasi co-location type associated with an activated TCI state, where the activated TCI state is applied to a PDSCH and has a minimum TCI state identifier.

In this example, the method described in this application may be considered as a PUCCH or SRS transmission spatial filter determination method. This method includes, in a case where the preset condition is satisfied, the UE determines the reference signal; and the UE determines a transmission spatial filter of the PUCCH or SRS according to the reference signal.

The reference signal may be a quasi co-location reference signal of a first quasi co-location type associated with an activated TCI state, where the activated TCI state is applied to a PDSCH and has a minimum TCI state identifier.

The preset condition includes at least one of: the UE is not provided with spatial relation information of the PUCCH; the UE is not provided with spatial relationship information of the SRS; a serving cell where the PUCCH is located is located in FR2; a serving cell where the SRS is located is located in FR2; a scheduled PDCCH is located in FR1; a scheduled PDCCH does not associate with a quasi co-location reference signal of a first quasi co-location type; a number of SRS resources included in an SRS resource set is greater than 1; a number of SRS resource sets is greater than 1; or a value of a first high-level parameter (such as maxNumberRxBeam) is greater than 1.

The PUCCH is used as an example, a PUCCH transmission spatial filter determination method is introduced, and this method is also applicable to a determination of the SRS transmission spatial filter.

For example, a serving cell 1 is located in the FR1, a serving cell 2 is located in the FR2, and a DCI on a PDCCH located in the serving cell 1 (it is assumed that the serving cell 1 is a primary cell (PCell)) schedules a PUCCH transmission located in the serving cell 2; a base station activates a TCI state set for receiving a PDSCH in the serving cell 2 through MAC-CE signaling, where the TCI state set includes a TCI state 1, a TCI state 2 and a TCI state 3, and QCL reference signals of QCL-Type D in the 3 TCI states are CSI-RS 1, CSI-RS 2 and CSI-RS 3, respectively; however, the base station does not configure a QCL reference signal of a QCL-Type D for receiving the PDCCH, which may indicate that, in the FR1, the UE receives the PDCCH omnidirectionally, i.e., the UE does not use a specific receiving beam; in addition, the value of the high-level parameter maxNumberRxBeam provided by the UE is greater than 1, and the UE is not provided with spatial relationship information of the PUCCH. In the above case, the UE may determine a transmission spatial filter for transmitting the PUSCH according to a receiving spatial filter of the QCL reference signal (i.e., CSI-RS 1) of the QCL-Type D associated with an activated TCI state (i.e., TCI state 1), where the activated TCI state is applied to a PDSCH and has a minimum TCI state identifier, that is, the UE may determine the transmission beam of the PUSCH according to a receiving beam of the CSI-RS 1.

In one embodiment, the preset condition includes a third preset condition, and the reference signal includes a quasi co-location reference signal of a first quasi co-location type associated with a CORESET in a nearest slot, where the CORESET has a minimum control resource set identifier.

In this example, the method described in this application may be considered as a PUCCH or SRS transmission spatial filter determination method. This method includes, in a case where the preset condition is satisfied, the UE determines the reference signal, and the UE determines a transmission spatial filter of the PUCCH or SRS according to the reference signal.

The reference signal may be a quasi co-location reference signal of a first quasi co-location type associated with a CORESET in a nearest slot, where the CORESET has a minimum control resource set identifier (CORESET ID).

The preset condition includes at least one of: the UE is not provided with spatial relation information of the PUCCH; the UE is not provided with spatial relationship information of the SRS; a serving cell where the PUCCH is located is located in FR2; a serving cell where the SRS is located is located in FR2; the scheduled PDCCH is located in FR1; a scheduled PDCCH does not associate with a quasi co-location reference signal of a first quasi co-location type; a number of SRS resources included in an SRS resource set is greater than 1; a number of SRS resource sets is greater than 1; or a value of a first high-level parameter (such as maxNumberRxBeam) is greater than 1.

The PUCCH is used as an example, a PUCCH transmission spatial filter determination method is introduced, and this method is also applicable to a determination of the SRS transmission spatial filter.

For example, a serving cell 1 is located in the FR1, a serving cell 2 is located in the FR2, and a DCI on a PDCCH located in the serving cell 1 (it is assumed that the serving cell 1 is a primary cell (PCell)) schedules a PUCCH transmission located in the serving cell 2, the PUCCH transmission is located on a slot n, and the base station configures 2 CORESET, i.e., a CORESET 0, a CORESET 1, for the UE on the slot n; a base station receives source reference signals in the QCL-Type D in a TCI state where the CORESET 0 and the CORESET 1 are activated through MAC-CE signaling, where the source reference signals in the QCL-Type D are a CSI-RS 1 and a CSI-RS 2, respectively, namely the QCL reference signals of the QCL-Type D associated with the CORESET 0 and the CORESET 1 are the CSI-RS 1 and the CSI-RS 2, respectively; however, the base station does not configure a QCL reference signal of a QCL-Type D for receiving the PDCCH, which may indicate that, in the FR1, the UE receives the PDCCH omnidirectionally, i.e., the UE does not use a specific receiving beam; in addition, the value of the high-level parameter maxNumberRxBeam provided by the UE is greater than 1, and the UE is not provided with spatial relationship information of the PUCCH. In the above case, the base station configures the reference signal through the RRC signaling or the MAC-CE signaling, and it is assumed that the reference signal is the SRS, then the UE may determine a transmission spatial filter for transmitting the PUCCH according to a transmission spatial filter of the reference signal (i.e., SRS) configured by the base station, that is, the UE may determine a transmission beam of the PUCCH according to the transmission beam of SRS. In the above case, the UE may determine the transmission spatial filter for transmitting the PUCCH according to a receiving spatial filter of the QCL reference signal (i.e., CSI-RS 1) of the QCL-Type D associated with the CORESET (i.e., CORESET 0) having the CORESET ID in a nearest slot (i.e., slot n), that is, the UE may determine a transmission beam for transmitting the PUSCH according to a receiving beam of the CSI-RS 1.

In one embodiment, the preset condition includes a fourth preset condition, and the reference signal includes a path loss reference signal of a first uplink channel in a path loss reference signal set of uplink channels corresponding to the uplink channel.

In this example, the method described in this application may be considered as a PUCCH path loss reference signal determination method. This method includes, in a case where the preset condition is satisfied, the UE determines the reference signal; and the UE determines a path loss reference signal of the PUCCH according to the reference signal.

The reference signal may be a reference signal for determining a path loss of the PUCCH by a first PUCCH path loss reference signal in a PUCCH path loss reference signal set corresponding to the PUCCH.

The preset condition includes that the UE is not provided with spatial relationship information of the PUCCH.

For example, in a service cell, the UE is configured with two CORESET groups, i.e., a CORESET group 1 and a CORESET group 2, which correspond to a PUCCH group 1 and a PUCCH group 2, respectively; the "correspondence" here means that a DCI located on the CORESET group 1 is used for scheduling the PUCCH group 1 and a DCI located on the CORESET group 2 is used for scheduling the PUCCH group 2. A base station configures power control parameters for the PUCCH group 1 and the PUCCH group 2 through RRC signaling, respectively, where the power control parameter includes the PUCCH path loss reference signal set; it is assumed that there are 2 PUCCH transmissions in the serving cell, i.e., a PUCCH 1 and a PUCCH 2, where the PUCCH 1 belongs to the PUCCH group 1, and the PUCCH 2 belongs to the PUCCH group 2, therefore, the PUCCH 1 and the PUCCH 2 correspond to 2 different PUCCH path loss reference signal sets, respectively; in addition, the UE is not provided with spatial relationship information of the PUCCH 1 and the PUCCH 2. In the above case, the UE may determine a path loss reference signal of the PUCCH 1 according to a first PUCCH path loss reference signal in a PUCCH path loss reference signal set corresponding to the PUCCH 1, and may determine a path loss reference signal of the PUCCH 2 according to a first PUCCH path loss reference signal in a PUCCH path loss reference signal set corresponding to the PUCCH 2.

In one embodiment, the method further includes, in a case where the four preset condition is satisfied, a P0 of an uplink channel is determined according to a first P0 in a target power P0 set corresponding to the uplink channel.

In one embodiment, the fourth preset condition includes that the first communication node is not provided with spatial relationship information of the uplink channel.

In this example, the method described in this application may be considered as a PUCCH target power determination method. In a case where a preset condition is satisfied, the UE determines a target power P0 of the PUCCH according to a first P0 in a target power P0 set corresponding to the PUCCH to determine a P0 reference signal of the PUCCH.

The preset condition includes at least one of: the UE is not provided with the spatial relationship information of the PUCCH.

For example, in a service cell, the UE is configured with two CORESET groups, i.e., a CORESET group 1 and a CORESET group 2, which correspond to a PUCCH group 1 and a PUCCH group 2, respectively; the "correspondence" here means that a DCI located on the CORESET group 1 is used for scheduling the PUCCH group 1 and a DCI located on the CORESET group 2 is used for scheduling the PUCCH group 2. A base station configures power control parameters for the PUCCH group 1 and the PUCCH group 2 through RRC signaling, respectively, where the power control parameter includes a target power P0 set; it is assumed that there are 2 PUCCH transmissions in the serving cell, i.e., a PUCCH 1 and a PUCCH 2, where the PUCCH 1 belongs to the PUCCH group 1, and the PUCCH 2 belongs to the PUCCH group 2, therefore, the PUCCH 1 and the PUCCH 2 correspond to 2 different P0 sets, respectively; in addition, the UE is not provided with spatial relationship information of the PUCCH 1 and the PUCCH 2. In the above case, the UE may determine a P0 of the PUCCH 1 according to a first P0 in a P0 set corresponding to the PUCCH 1, and may determine a P0 of the PUCCH 2 according to a first P0 in a P0 set corresponding to the PUCCH 2.

In one embodiment, the preset condition includes a fifth preset condition, and the reference signal includes a quasi co-location reference signal of a first quasi co-location type associated with an m-th CORESET in a nearest slot.

In one embodiment, an uplink signal belongs to an n-th channel detection reference signal SRS resource set, where m and n are positive integers, and m is equal to n.

In one embodiment, the fifth preset condition includes that the first communication node is not provided with spatial relationship information of the uplink signal.

In this example, the method described in this application may be considered as an SRS transmission spatial filter determination method. This method includes, in a case where the preset condition is satisfied, the UE determines the reference signal; and the UE determines a transmission spatial filter of the SRS according to the reference signal.

The reference signal may be the quasi co-location reference signal of the first quasi co-location type associated with the m-th CORESET in the nearest slot; and the SRS belongs to the n-th resource set. The "m-th CORESET" may refer to an m-th CORESET with the CORESET IDs in the slot sequentially arranged from small to large; and the "n-th SRS resource set" may refer to a n-th SRS resource set with SRS resource set IDs sequentially arranged from small to large.

The m and n satisfy following characteristics: m=n; optionally, values of m and n may be configured by the base station.

The preset condition includes that the UE is not provided with spatial relationship information of the SRS.

For example, in a serving cell, the UE is configured with 2 SRS resource sets, i.e., an SRS resource set 1 and an SRS resource set 2; at a given time (such as slot n), there is an SRS 1 transmission and an SRS 2 transmission, where an SRS 1 belongs to the SRS resource set 1 and an SRS 2 belongs to the SRS resource set 2; in addition, the UE is configured with 2 CORESET, i.e., a CORESET 0 and a CORESET 1, and is located on the slot n, where the base station receives source reference signals in the QCL-Type D in a TCI state where the CORESET 0 and the CORESET 1 are activated through MAC-CE signaling, where the source reference signals in the QCL-Type D are a CSI-RS 1 and a CSI-RS 2, respectively, namely the QCL reference signals of the QCL-Type D associated with the CORESET 0 and the CORESET 1 are the CSI-RS 1 and the CSI-RS 2, respectively. If the UE is not provided with spatial relationship information of the SRS 1 and the SRS 2; it is assumed that m=1, n=1, in the above case, the UE may determine the transmission spatial filter for transmitting the SRS 1 according to a receiving spatial filter of the QCL reference signal (i.e., CSI-RS 1) of the QCL-Type D associated with a first CORESET (i.e., CORESET 0) in a nearest slot (i.e., slot n); it is assumed that m=2, n=2, in the above case, the UE may determine the transmission spatial filter for transmitting the SRS 2 according to a receiving spatial filter of the QCL reference signal (i.e., CSI-RS 2) of the QCL-Type D associated with a second CORESET (i.e., CORESET 1) in a nearest slot (i.e., slot n).

Figure 2:
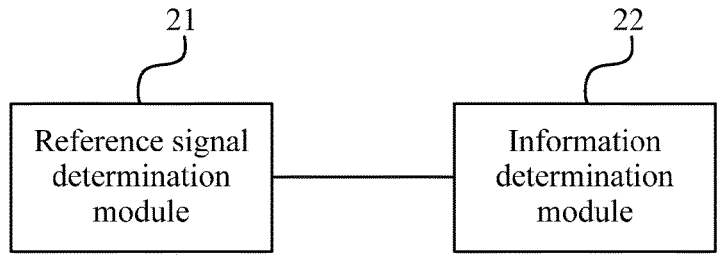
FIG. 2 is a schematic structural diagram of an information determination device provided in an embodiment of the present application.

The present application further provides an information determination device, and FIG. 2 is a schematic structural diagram of an information determination device provided in an embodiment of the present application. The information determination device is configured at a first communication node, as shown in FIG. 2. The device includes a reference signal determination module 21 and an information determination module 22. The reference signal determination module 21 is configured to determine a reference signal in a case where a preset condition is satisfied. The information determination module 22 is configured to determine information of an uplink signal or information of an uplink channel according to the reference signal.

The information determination device provided in this embodiment is used for implementing the information determination method as provided in this application, and the information determination device provided in this embodiment is similar to the information determination method in an implementation principle and a technical effect, which is not described herein again.

On the basis of the above-described embodiments, a modified embodiment of the above-described embodiments is proposed, and in order to make the description brief, only the differences from the above-described embodiments are described in the modified embodiment.

In one embodiment, the preset condition includes a first preset condition, and the reference signal includes a quasi co-location reference signal of a first quasi co-location type associated with a physical downlink control channel (PDCCH), where the PDCCH schedules the uplink signal or the uplink channel.

In one embodiment, the preset condition includes a first preset condition, and the reference signal includes a quasi co-location reference signal of a first quasi co-location type associated with an activated TCI state, where the activated TCI state is applied to a PDSCH and has a minimum TCI state identifier.

In one embodiment, the quasi co-location reference signal includes a periodic downlink reference signal. That is, in the case where the path loss reference signal of the uplink signal or the path loss reference signal of the uplink channel is determined, the quasi co-location reference signal includes the periodic downlink reference signal.

In one embodiment, the preset condition includes a first preset condition, and the reference signal includes a downlink signal associated with a physical random access channel (PRACH), where the PRACH is a PRACH closest to the uplink signal or the uplink channel in a time domain.

In one embodiment, the downlink signal includes one of: a synchronization signal block SSB, a channel state information reference signal (CSI-RS), or a channel measurement reference signal.

In one embodiment, the preset condition includes a first preset condition, and the reference signal includes a quasi co-location reference signal of a first quasi co-location type associated with a control resource set (CORESET) in a nearest slot, where the CORESET has a minimum control resource set identifier.

In one embodiment, the first preset condition includes at least one of: the uplink signal is scheduled by a downlink control information (DCI) format 0_0 of a serving cell; the uplink channel is scheduled by the DCI format 0_0 of a serving cell; a serving cell where the uplink signal is located is not configured with a physical uplink control channel (PUCCH) resource; a serving cell where the uplink channel is located is not configured with the physical uplink control channel (PUCCH) resource; or the first communication node is not configured with a spatial setting for a PUCCH transmission.

In one embodiment, the preset condition includes a second preset condition, and the reference signal includes a reference signal configured by a second communication node.

In one embodiment, the preset condition includes a second preset condition, and the reference signal includes a quasi co-location reference signal of a first quasi co-location type associated with a PDCCH, where the PDCCH schedules the uplink signal or the uplink channel.

In one embodiment, the preset condition includes a second preset condition, and the reference signal includes a quasi co-location reference signal of a first quasi co-location type associated with an activated TCI state, where the activated TCI state is applied to a PDSCH and has a minimum TCI state identifier.

In one embodiment, the second preset condition includes at least one of: the first communication node is not provided with spatial relationship information of the uplink signal or spatial relationship information of the uplink channel; a serving cell where the uplink signal is located does not include a CORESET; or a serving cell where the uplink channel is located does not include a CORESET.

In one embodiment, the preset condition includes a third preset condition, and the reference signal includes a reference signal configured by a second communication node.

In one embodiment, the preset condition includes a third preset condition, and the reference signal includes a quasi co-location reference signal of a first quasi co-location type associated with an activated TCI state, where the activated TCI state is applied to a PDSCH and has a minimum TCI state identifier.

In one embodiment, the preset condition includes a third preset condition, and the reference signal includes a quasi co-location reference signal of a first quasi co-location type associated with a CORESET, where the CORESET has a minimum control resource set identifier in a nearest slot.

In one embodiment, the third preset condition includes at least one of: the first communication node is not provided with spatial relationship information of the uplink channel; the first communication node is not provided with spatial relationship information of the uplink signal; the PDCCH scheduling the uplink signal is located in a first frequency band; a serving cell where the uplink signal is located is located in a second frequency band, where a frequency of the second frequency band is higher than a frequency of the first frequency band; a PDCCH scheduling the uplink channel is located in a first frequency band; a serving cell where the uplink channel is located is located in a second frequency band; the PDCCH scheduling the uplink signal does not associate with the quasi co-location reference signal of the first quasi co-location type; the PDCCH scheduling the uplink channel does not associate with the quasi co-location reference signal of the first quasi co-location type; a number of uplink signal resources included in an uplink signal resource set is greater than 1; a number of uplink signal resource sets is greater than 1; or a value of a first high-level parameter is greater than 1.

In one embodiment, the preset condition includes a fourth preset condition, and the reference signal includes a path loss reference signal of a first uplink channel in a path loss reference signal set of uplink channels corresponding to the uplink channel.

In one embodiment, the device further includes a target power determination module. The target power determination module is configured to determine a P0 of an uplink channel according to a first P0 in a target power P0 set corresponding to the uplink channel in a case where the fourth preset condition is satisfied.

In one embodiment, the fourth preset condition includes that the first communication node is not provided with spatial relationship information of the uplink channel.

In one embodiment, the preset condition includes a fifth preset condition, and the reference signal includes a quasi co-location reference signal of a first quasi co-location type associated with an m-th CORESET in a nearest slot.

In one embodiment, an uplink signal belongs to an n-th channel detection reference signal SRS resource set, where m and n are positive integers, and m is equal to n.

In one embodiment, the fifth preset condition includes that the first communication node is not provided with spatial relationship information of the uplink signal.

In one embodiment, the information determination module is configured to include at least one of: a transmission spatial filter of the uplink signal or a transmission spatial filter of the uplink channel is determined according to a transmission spatial filter of the reference signal; the transmission spatial filter of the uplink signal or the transmission spatial filter of the uplink channel is determined according to a receiving spatial filter of the reference signal; or a path loss reference signal of the uplink signal or a path loss reference signal of the uplink channel is determined according to the reference signal.

In one embodiment, the uplink signal includes an SRS, and the uplink channel includes at least one of a PUCCH or a physical uplink shared channel.

Figure 3:
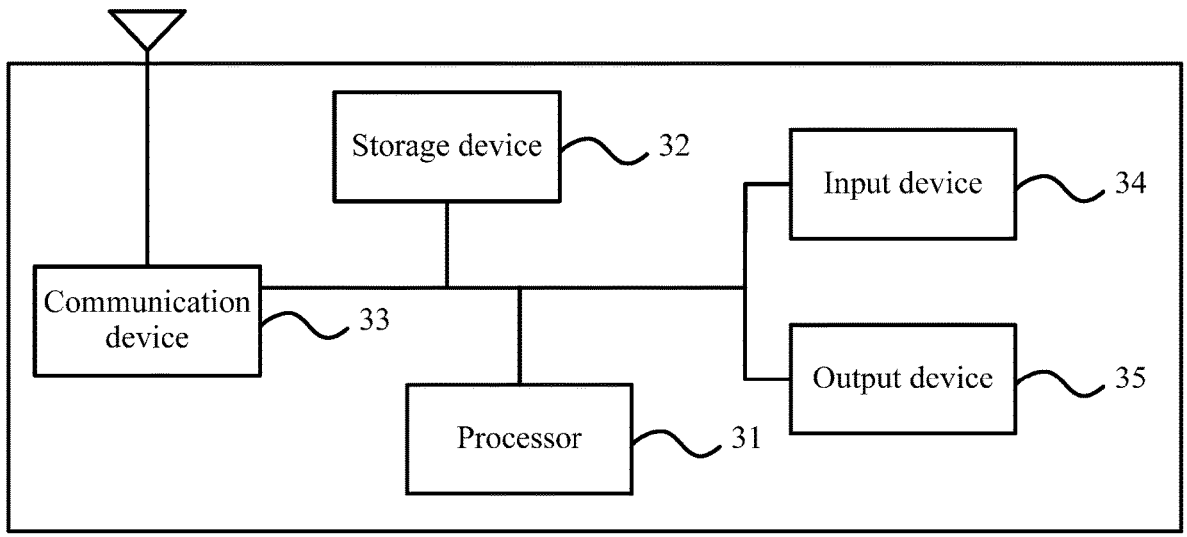
FIG. 3 is a schematic structural diagram of a first communication node provided in an embodiment of the present application.

An embodiment of the present application further provide a first communication node, and FIG. 3 is a schematic structural diagram of a first communication node provided in an embodiment of the present application. As shown in FIG. 3, a first communication node provided in the present application includes one or more processors 31 and a storage device 32. The processors 31 in this first communication node may include one or more processors, one processor 31 is used as an example in FIG. 3. The storage device 32 is used for storing one or more programs; and the one or more programs are executed by the one or more processors 31 such that the one or more processor 31 implements the method as described in the embodiments of the present application.

The first communication node further includes a communication device 33, an input device 34, and an output device 35.

The processors 31, the storage device 32, the communication device 33, the input device 34, and the output device 35 in the first communication node may be connected via a bus or otherwise, with the connection via a bus being used as an example in FIG. 3.

The input device 34 may be used for receiving input numeric or character information and for generating a key signal input related to user settings and functional control of the first communication node. The output device 35 may include a display device such as a display screen.

The communication device 33 may include a receiver and a transmitter. The communication device 33 is configured to perform an information transceiving communication according to a control of the processor 31.

The storage device 32, as a computer readable storage medium, may be configured to store a software program, a computer executable program, and a module, such as program instructions/modules corresponding to the method described in the embodiments of the present application (such as a reference signal determination module 21 and an information determination module 22 in a position information determination device). The storage device 32 may include a storage program area and a storage data area. The storage program area may store an operating system and an application program required for at least one function. The storage data area may store data created according to the use of the first communication node, etc. Moreover, the storage device 32 may include a high-speed random access memory, and may also include a non-volatile memory such as at least one magnetic disk storage device, flash memory device, or other non-volatile solid state storage device. In some instances, the storage device 32 may include memories which are remotely disposed relative to the processor 31, and these remote memories may be connected to the first communication node via a network. Instances of the network described above include, but are not limited to, Internets, corporate intranets, local area networks, mobile communication networks, and combinations thereof.

An embodiment of the present application further provides a storage medium. The storage medium stores a computer program, the computer program, when executed by a processor, implements the method described in any one of the embodiments of the present application. The method includes, in a case where a preset condition is satisfied, a reference signal is determined; and information of an uplink signal or an uplink channel is determined according to the reference signal.

The computer storage medium of the embodiments of the present application may adopt any combination of one or more computer readable media. The computer readable medium may be a computer readable signal medium or a computer readable storage medium. The computer readable storage medium may be, for example, but not limited to, an electronic, magnetic, optical, electromagnetic, infrared, or semiconductor system, apparatus, or device, or any combination of the foregoing. Examples (a non-exhaustive list) of the computer readable storage medium include: an electrical connection having one or more wires, a portable computer diskette, a hard disk, a random access memory (RAM), a read only memory (ROM), an erasable programmable read only memory (EPROM), a flash memory, an optical fiber, a portable CD-ROM, an optical storage device, a magnetic storage device, or any suitable combination of the foregoing. A computer readable storage medium may be any tangible medium that may contain, or store a program for use by or in connection with an instruction execution system, apparatus, or device.

A computer readable signal medium may include a propagated data signal with a computer readable program code carried therein, for example, in a baseband or as part of a carrier wave. Such a propagated data signal may adopt a variety of forms, including, but not limited to an electromagnetic signal, an optical signal, or any suitable combination of the foregoing. The computer readable signal medium may be any computer readable medium that is not a computer readable storage medium and that may transmit, propagate, or transport a program for use by or in connection with an instruction execution system, apparatus, or device.

Program codes embodied on the computer readable medium may be transmitted using any appropriate medium, including but not limited to: wireless, wire, optic cable, radio frequency (RF), etc., or any suitable combination of the foregoing.

A computer program code for performing the operations of the present application may be written in one or more programming languages or combinations thereof, the described programming languages include an object-oriented programming language—such as Java, Smalltalk, C++, and further include a conventional procedural programming language—such as a "C" language or similar programming language. The program code may be executed in following manners: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network, including a local area network (LAN) or a wide area network (WAN), or may be connected to an external computer (for example, connected to the external computer through an internet provided by an internet service provider).

The above description is only an exemplary embodiment of the present application, and is not intended to limit the scope of protection of the present application.

The first communication node includes any suitable type of wireless user equipment such as a mobile phone, a portable data processing device, a portable web browser or a vehicular mobile station.

In general, various embodiments of the present application may be implemented in hardware or special purpose circuits, software, logic or any combination thereof. For example, some aspects may be implemented in hardware, while other aspects may be implemented in firmware or software which may be executed by a controller, microprocessor or other computing device, although the present application is not limited thereto.

Embodiments of the present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), etc. Computer readable media may include non-instantaneous storage media. Data processors may be of any type suitable for the local technical environment, such as, but not limited to, general-purpose computers, specialized computers, microprocessors, digital signal processors (DSP), application specific integrated circuits (ASIC), field-programmable gate array (FPGA)), and processors based on multi-core processor architectures.

What is claimed is:

1. A communication method, applied to a first communication node, comprising:
   in response to a condition being satisfied, determining a quasi co-location reference signal of a first quasi co-location type associated with an activated transmission configuration indication (TCI) state, the activated TCI state having a minimum TCI state identifier, wherein the condition comprises:
      the first communication node is not provided with spatial relationship information of an uplink signal, and
      a serving cell where the uplink signal is located is not configured with a control resource set (CORESET);
   determining information of the uplink signal according to the quasi co-location reference signal; and
   communicating with a second communication node based on the information,
   wherein the determining the information of the uplink signal comprises:
      determining a pathloss reference signal of the uplink signal according to the quasi co-location reference signal.

2. The method of claim 1, wherein the activated TCI state is applied to a PDSCH.

3. The method of claim 1, wherein the uplink signal comprises a sounding reference signal (SRS).

4. A communication node comprising:
   a processor and a memory, wherein, when the processor reads instructions from the memory, the processor is configured to perform:
      in response to a condition being satisfied, determining a quasi co-location reference signal of a first quasi co-location type associated with an activated transmission configuration indication (TCI) state, the activated TCI state having a minimum TCI state identifier, wherein the condition comprises:
         the first communication node is not provided with spatial relationship information of an uplink signal, and
         a serving cell where the uplink signal is located is not configured with a control resource set (CORESET);
      determining information of an uplink signal according to the quasi co-location reference signal; and
      communicating with a second communication node based on the information,
      wherein the determining the information of the uplink signal comprises:
         determining a pathloss reference signal of the uplink signal according to the quasi co-location reference signal.

5. The communication node of claim 4, wherein the activated TCI state is applied to a PDSCH.

6. The communication node of claim 4, wherein the uplink signal comprises a sounding reference signal (SRS).

7. A method for communication between a first communication node and a second communication node, the method applied to the second communication node, and the method comprising:
   communicating with the first communication node based on information of an uplink signal, wherein:
   the information of the uplink signal is determined according to a quasi co-location reference signal;
   the quasi co-location reference signal of a first quasi co-location type associated with an activated transmission configuration indication (TCI) state, is determined in response to a condition being satisfied, the activated TCI state having a minimum TCI state identifier; and
   the condition comprises:
      the first communication node is not provided with spatial relationship information of the uplink signal, and
      a serving cell where the uplink signal is located is not configured with a control resource set (CORESET),
   wherein the information of the uplink signal being determined according to the quasi co-location reference signal comprises a pathloss reference signal of the uplink signal being determined according to the quasi co-location reference signal.

8. The method of claim 7, wherein the activated TCI state is applied to a PDSCH.

9. The method of claim 7, wherein the uplink signal comprises a sounding reference signal (SRS).

10. A communication node comprising:
a processor and a memory, wherein, when the processor reads instructions from the memory, the processor is configured to perform:
  communicating with an other communication node based on information of an uplink signal, wherein:
  the information of the uplink signal is determined according to a quasi co-location reference signal;
  the quasi co-location reference signal of a first quasi co-location type associated with an activated transmission configuration indication (TCI) state, is determined in response to a condition being satisfied, the activated TCI state having a minimum TCI state identifier; and
  the condition comprises:
    the other communication node is not provided with spatial relationship information of the uplink signal, and
    a serving cell where the uplink signal is located is not configured with a control resource set (CORESET),
  wherein the information of the uplink signal being determined according to the quasi co-location reference signal comprises a pathloss reference signal of the uplink signal being determined according to the quasi co-location reference signal.

11. The communication node of claim 10, wherein the activated TCI state is applied to a PDSCH.

12. The communication node of claim 10, wherein the uplink signal comprises a sounding reference signal (SRS).

13. A non-transitory storage medium, stored therein a computer program, wherein the computer program, when executed by a processor of a communication node, causing the processor to perform the method of claim 1.

14. A non-transitory storage medium, stored therein a computer program, wherein the computer program, when executed by a processor of a communication node, causing the processor to perform the method of claim 7.

* * * * *